(12) United States Patent
Benisty et al.

(10) Patent No.: US 11,656,798 B1
(45) Date of Patent: May 23, 2023

(54) IMMEDIATE PARTIAL HOST BUFFER FETCHING

(71) Applicant: Western Digital Technologies, Inc., San Jose, CA (US)

(72) Inventors: Shay Benisty, Beer Sheva (IL); Amir Segev, Meiter (IL)

(73) Assignee: Western Digital Technologies, Inc., San Jose, CA (US)

(*) Notice: Subject to any disclaimer, the term of this patent is extended or adjusted under 35 U.S.C. 154(b) by 56 days.

(21) Appl. No.: 17/457,587

(22) Filed: Dec. 3, 2021

(51) Int. Cl.
*G06F 3/06* (2006.01)

(52) U.S. Cl.
CPC .......... *G06F 3/0659* (2013.01); *G06F 3/0614* (2013.01); *G06F 3/0656* (2013.01); *G06F 3/0673* (2013.01)

(58) Field of Classification Search
CPC .... G06F 3/0659; G06F 3/0614; G06F 3/0656; G06F 3/0673
See application file for complete search history.

(56) References Cited

U.S. PATENT DOCUMENTS

| | | | | |
|---|---|---|---|---|
| 10,282,132 B2 * | 5/2019 | A | ................ | G06F 3/0659 |
| 10,657,087 B2 * | 5/2020 | Tomlin | ................ | G06F 12/0246 |
| 10,782,915 B2 | 9/2020 | Kim et al. | | |
| 10,963,190 B2 | 3/2021 | Haga et al. | | |
| 2016/0026388 A1 * | 1/2016 | Jeong | ................ | G06F 3/061 |
| | | | | 711/112 |
| 2016/0291867 A1 * | 10/2016 | Olcay | ................ | G06F 3/068 |
| 2018/0260347 A1 * | 9/2018 | Benisty | ................ | G06F 3/0688 |
| 2020/0050558 A1 * | 2/2020 | Suri | ................ | G06F 13/1668 |
| 2021/0103445 A1 | 4/2021 | Schauer et al. | | |

* cited by examiner

*Primary Examiner* — Charles Rones
*Assistant Examiner* — Hewy H Li
(74) *Attorney, Agent, or Firm* — Patterson + Sheridan, LLP; Steven H. VerSteeg

(57) ABSTRACT

The present disclosure generally relates to improving data transfer in a data storage device. Not only prior to executing a command received from a host device, but even before scheduling the command, the data storage device parses the command and fetches physical region page (PRP) entries and/or scatter-gather list (SGL) entries. The fetching occurs just after receiving the command. Additionally, the host buffer pointers, which are described in PRP or SGL methods, associated with the entries are also fetched prior to scheduling the command. The fetching is a function of device constraints, queue depth, and/or tenant ID in a multi-tenant environment. The immediate fetching of at least part of the host buffers improves device performance, particularly in sequential write or read look ahead (RLA) scenarios.

20 Claims, 8 Drawing Sheets

IMMEDIATE PARTIAL HOST BUFFER FETCHING

BACKGROUND OF THE DISCLOSURE

Field of the Disclosure

Embodiments of the present disclosure generally relate to improving data transfer in a data storage device.

Description of the Related Art

Nonvolatile memory express (NVMe) is an interface protocol for a host device and a data storage device, such as a solid state drive (SSD), based on a paired submission and completion queue mechanism. Commands are placed by host software into a submission queue. Completions are placed into a completion queue by a controller of the data storage device. Submission and completion queues are allocated in a memory of a host device.

The physical memory locations in host memory (i.e., host buffers) which are used for data transfers are specified using physical region page (PRP) entries or scatter gather list (SGL) entries. PRPs are used as a scatter/gather mechanism for data transfers between the controller and the host device, and the PRP method assumes that each host buffer has the same fixed size other than the first buffer. For example, the first PRP might have an offset and the size of the last PRP defined by the size of the first PRP and the total transfer size associated with the command.

On the other hand, SGL methods do not assume anything about the size of the host buffers. Generally, each buffer may have any size. Each buffer is described by a dedicated SGL data block descriptor in which the address and the size of the buffer are specified. SGL is a more advanced method for describing host buffers while not taking any assumption.

PRP/SGL fetching algorithms have a direct and strong impact on performance, quality of service (QoS), area, and power. Bubbles, known as delays or latency in data transfer, may occur due to the host buffer fetching when the data is available, but the data storage device waits for the host buffers.

Therefore, there is a need in the art for more efficient host buffer fetching.

SUMMARY OF THE DISCLOSURE

The present disclosure generally relates to improving data transfer in a data storage device. Not only prior to executing a command received from a host device, but even before scheduling the command, the data storage device parses the command and fetches physical region page (PRP) entries and/or scatter-gather list (SGL) entries. The fetching occurs just after receiving the command. Additionally, the host buffer pointers, which are described in PRP or SGL methods, associated with the entries are also fetched prior to scheduling the command. The fetching is a function of device constraints, queue depth, and/or tenant ID in a multi-tenant environment. The immediate fetching of at least part of the host buffers the command improves device performance, particularly in sequential write or read look ahead (RLA) scenarios.

In one embodiment, a data storage device comprises: a memory device; and a controller coupled to the memory device, wherein the controller is configured to: fetch a command from a host device, wherein the command meets a predefined threshold; parse the command; fetch entries associated with the command, wherein the entries are host buffer pointers; and store the fetched entries in a command context with the command and parsing results.

In another embodiment, a data storage device comprises: a memory device; and a controller coupled to the memory device, wherein the controller includes: a host interface module (HIM); a command scheduler; an initial buffer pointer fetcher, wherein the initial buffer pointer fetcher is configured to fetch one or more entries associated with a command prior to scheduling the command, wherein the fetching is a function of queue depth; a command context; and one or more processors, wherein the initial buffer pointer fetcher is coupled to the HIM, the command scheduler, the command context, and the one or more processors.

In another embodiment, a data storage device comprises: memory means; and a controller coupled to the memory means, wherein the controller is configured to: receive a command from one or more host devices; parse the command; fetch physical region page (PRP) and/or scatter-gather list (SGL) pointers associated with the command; and fetch host buffers associated with the pointers, wherein fetching the PRP and/or SGL pointers and fetching the host buffers is a function of host device ID.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments.

Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improving data transfer in a data storage device. Not only prior to executing a command received from a host device, but even before scheduling the command, the data storage device parses the command and fetches physical region page (PRP) entries and/or scatter-gather list (SGL) entries. The fetching occurs just after receiving the command. Additionally, the host buffer pointers, which are described in PRP or SGL methods, associated with the entries are also fetched prior to scheduling the command. The fetching is a function of device constraints, queue depth, and/or tenant ID in a multi-tenant environment. The immediate fetching of at least part of the host buffers improves device performance, particularly in sequential write or read look ahead (RLA) scenarios.

Figure 1:
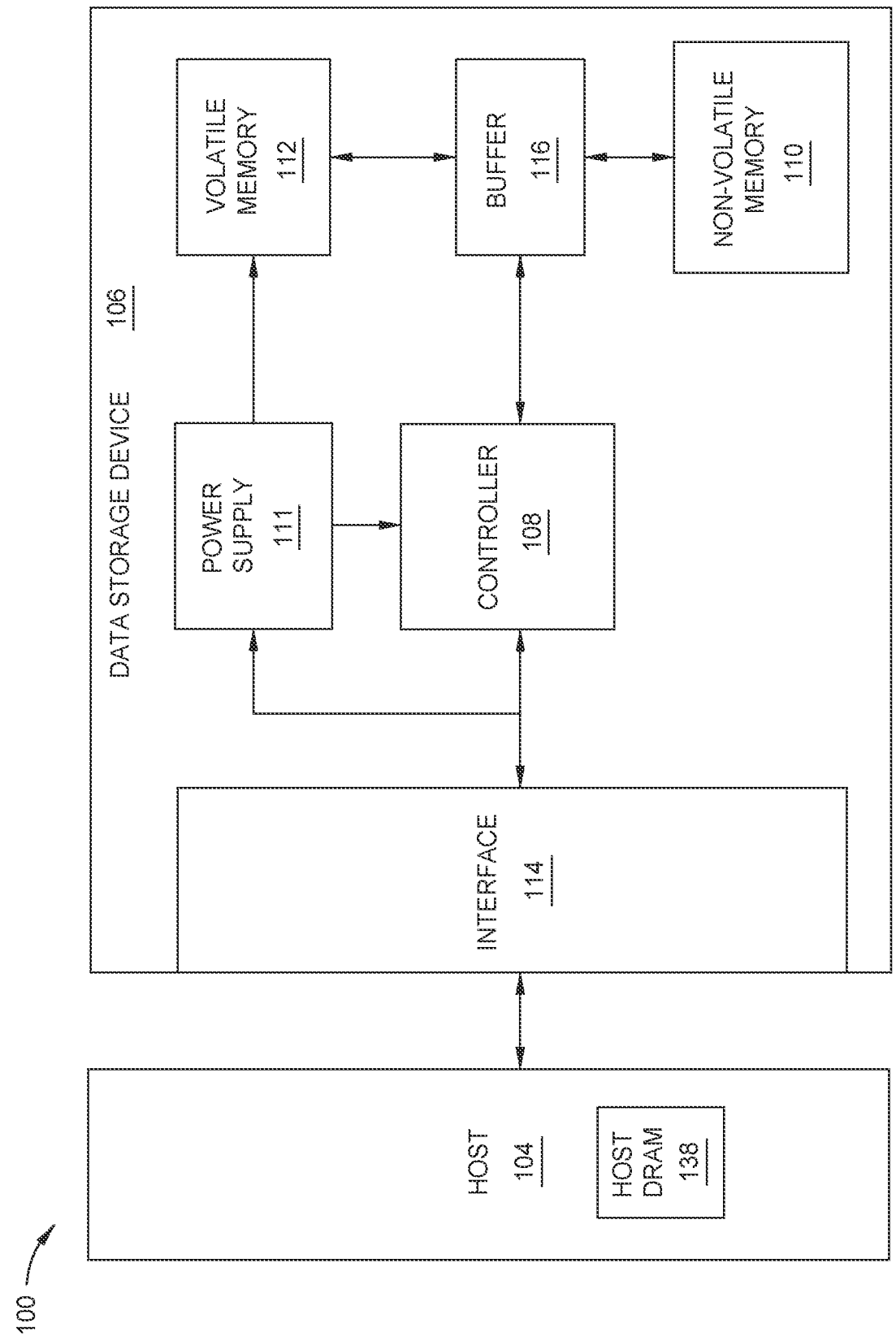
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
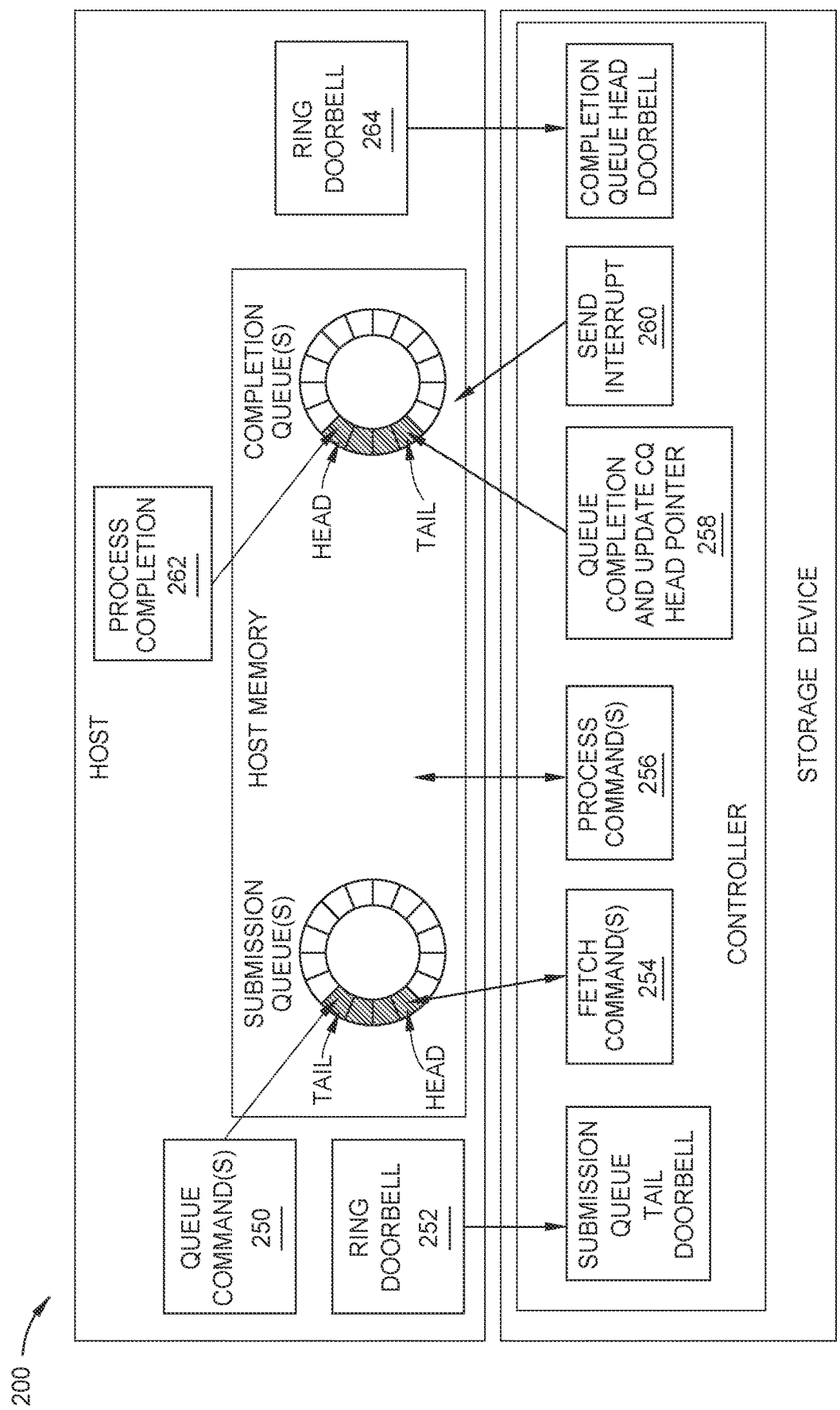
FIG. 2 is a block diagram illustrating a method of operating a storage device to execute a read or write command, according to one embodiment.

FIG. 2 is a block diagram illustrating a method 200 of operating a storage device to execute a read, write, or compare command, according to one embodiment. Method 200 may be used with the storage system 100 having a host device 104 and a data storage device 106 comprising a controller 108. Method 200 may be used with the device a host device and a data storage device comprising a command processor.

Method 200 begins at operation 250, where the host device writes a command into a submission queue as an entry. The host device may write one or more commands into the submission queue at operation 250. The commands may be read commands or write commands or compare commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queue. In operation 254, in response to receiving the doorbell or interrupt signal, a controller of the storage device fetches the command from the one or more submission queue, and the controller receives or DMA reads the command.

In operation 256, the controller processes the command and writes, transfers data associated with a read command to the host device memory, or retrieves data for a compare command. The controller may process more than one command at a time. The controller may process one or more commands in the submission order or in the sequential order. Processing a write command may comprise identifying a stream to write the data associated with the command to and writing the data to one or more logical block address (LBA) of the stream.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
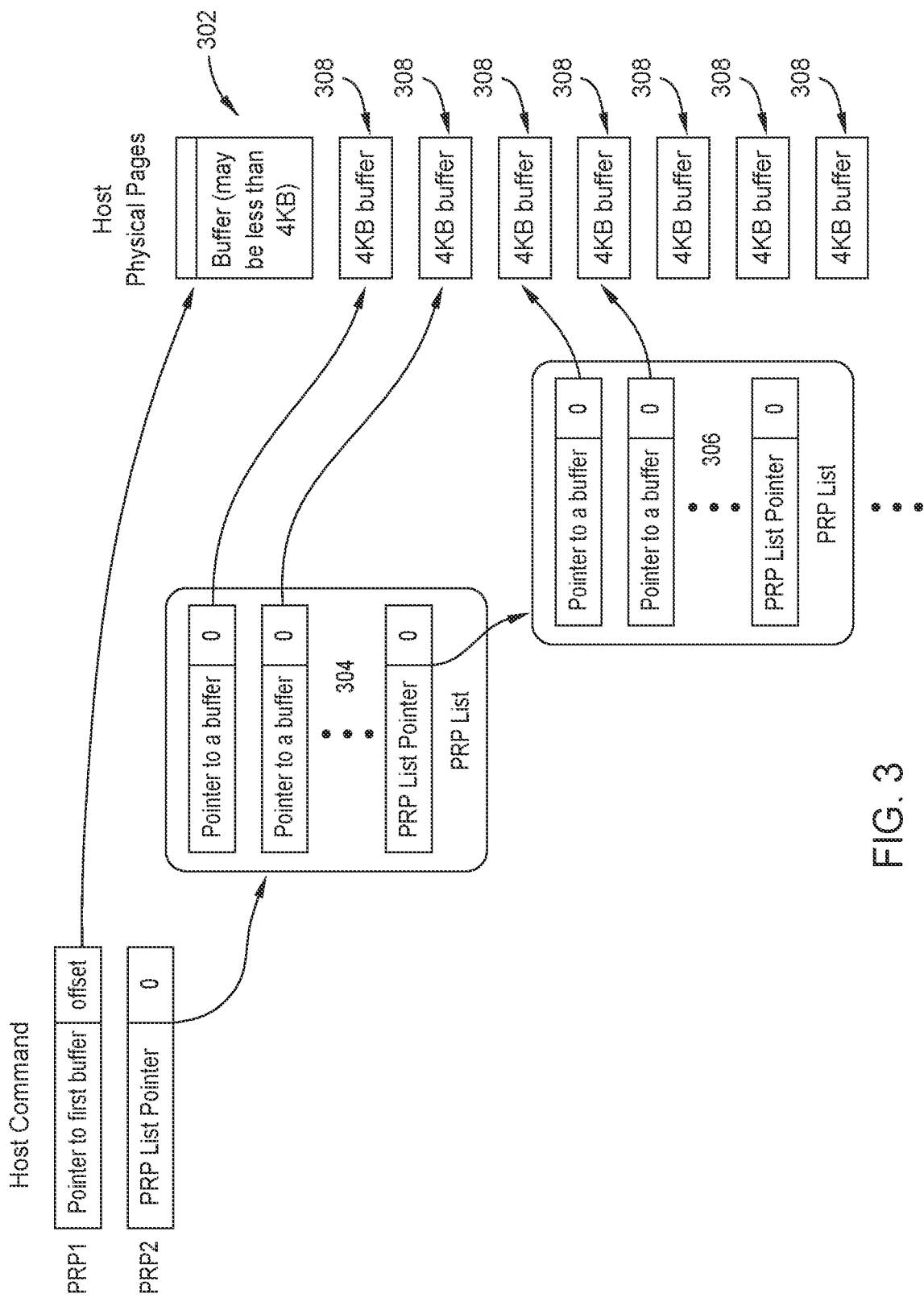
FIG. 3 is a schematic illustration of host buffers using physical region page (PRP) entries according to one embodiment.

FIG. 3 is a schematic illustration of host buffers using physical region page (PRP) entries according to one embodiment. When using PRP entries, it is assumed that each host buffer has the same fixed size, except for the first host buffer. PRP1 points to the first host buffer 302, which, as noted, may be less than 4 KB, exactly 4 KB or more than 4 KB. Additionally, the first host buffer 302 may be the exact same size as the remaining host buffers 308, but may also be different. PRP2, however, may point to a PRP list 304. In the scenario shown in FIG. 3, there are two PRP lists, but it is to be understood that more or less PRP lists may be present. The number of PRP lists depends upon the data transfer size of the relevant command. As shown in FIG. 3, the last pointer in the PRP list 304 points to another PRP list 306. Each additional host buffer 308 is the same size, which in the embodiment shown in FIG. 3, is 4 KB. It is to be understood that while 4 KB is shown at the example size of the host buffers 308, other sizes are contemplated. It is also to be noted that host buffers 308 will be the same size, regardless of what the size happens to be.

Figure 4:
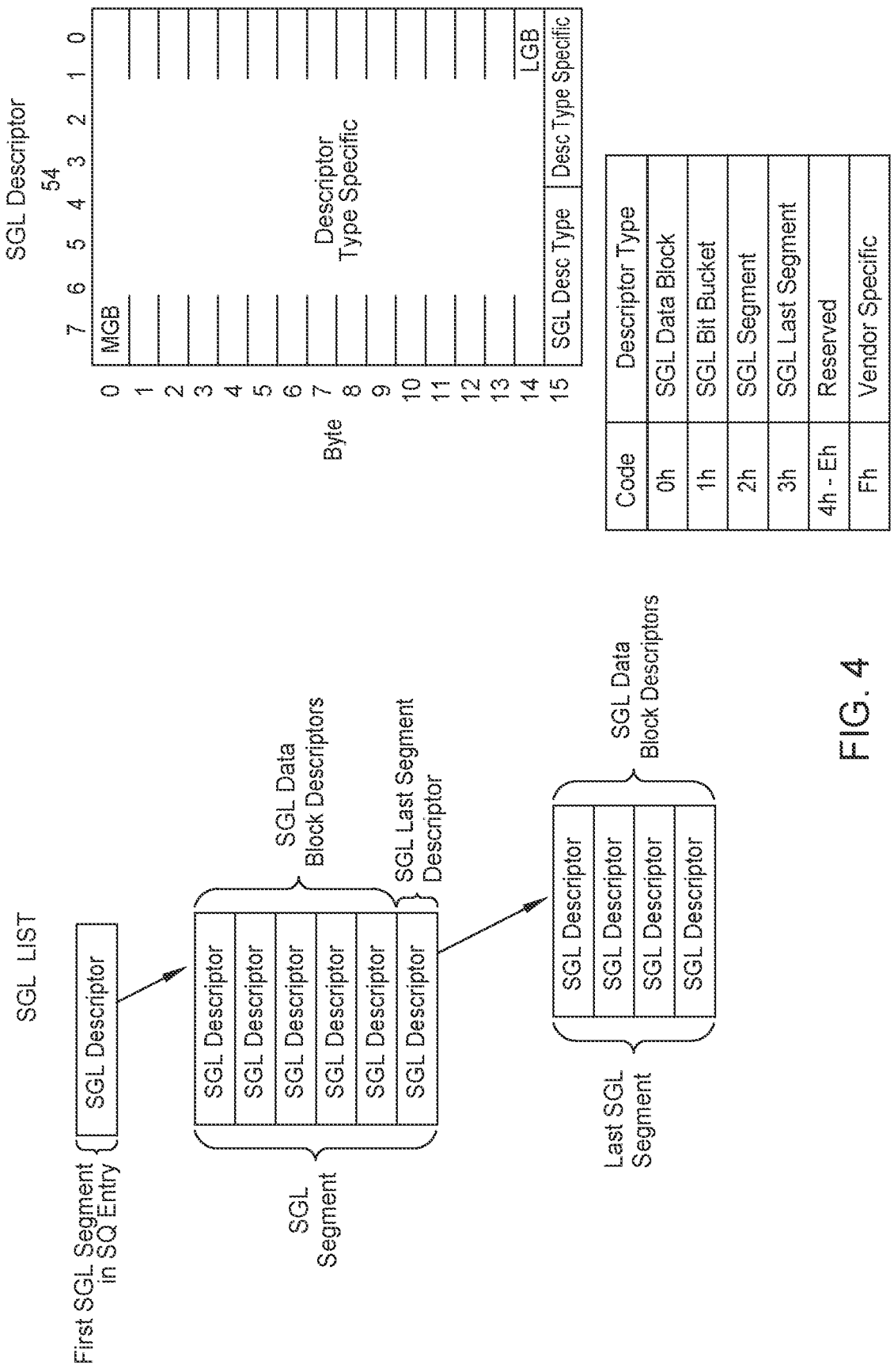
FIG. 4 is a schematic illustration of a scatter gather list (SGL) method according to one embodiment.

FIG. 4 is a schematic illustration of a SGL method according to one embodiment. SGLs are another method used for describing host buffers while not having any alignment constraints. Several SGL types are defined in the NVMe standard as shown in FIG. 4. As shown in FIG. 4, the SGL command contains an SGL segment descriptor which points to a bunch of SGL data block descriptors. The last descriptor in this chunk is an SGL last segment descriptor which points to the last bunch of SGL data block descriptors.

As will be discussed herein, the data storage device controller fetches at least some of the host buffers immediately after the command fetching. In regards to fetching the host buffers, it is to be understood that fetching the host buffers includes fetching data stored in the host buffers and not physically fetching the actual host buffer. Each command slot implemented in the data storage device controller incorporates a memory that holds the host command, parsing results, and several slots that could hold the host pointers. The extra slots that hold the few first host buffer pointers have a fixed size (e.g., 64 or 128 bytes). The structure of those slots depends on the used buffer method specifically to the associated command (i.e., PRP/SGL). When the PRP method is used, less information should be kept and therefore more pointers can be held in the slot. When SGL method is used, more information should be kept and therefore fewer pointers could be held in a slot. Only those first PRP/SGL buffer pointers are held in the command context. Other buffer pointers will be fetched later in the flow and stored in a dedicated memory.

The main benefit of the idea is the performance and QoS optimization in sequential write and read look ahead (RLA) match flows. In those scenarios, the first host buffer pointers must be available internally immediately after the command fetching, otherwise bubbles would be seen on the interface.

Figure 5:
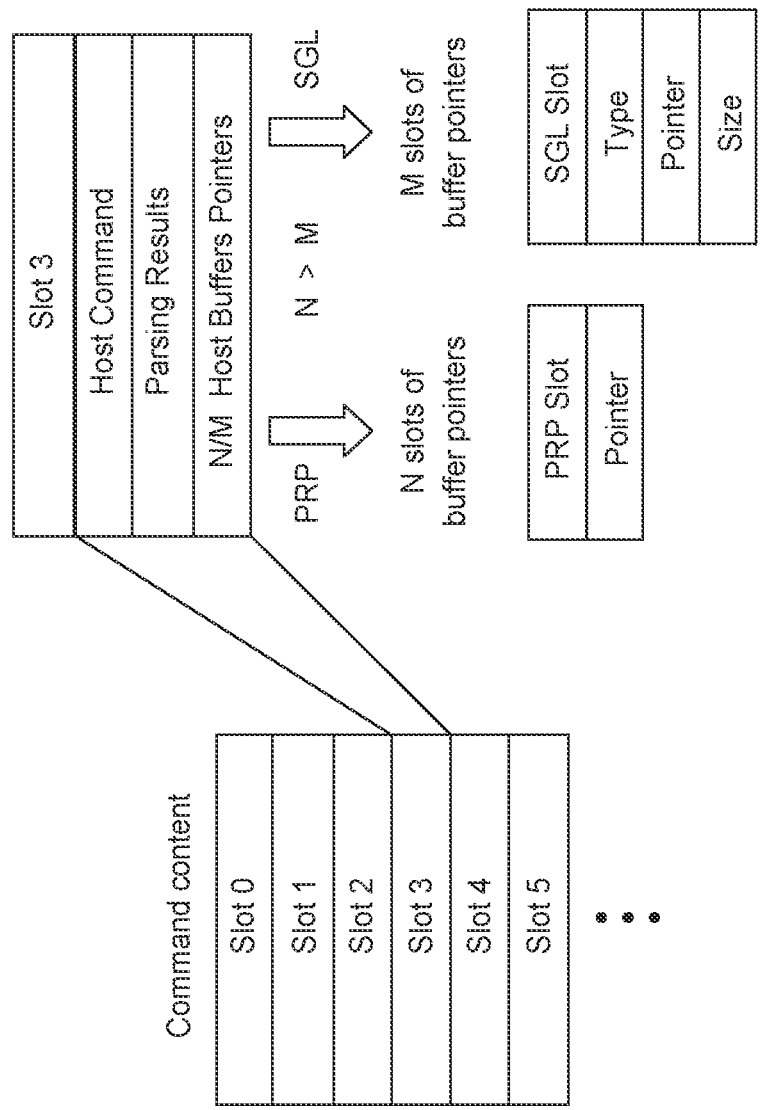
FIG. 5 is a schematic illustration of a command context structure according to one embodiment.

FIG. 5 is a schematic illustration of a command context structure according to one embodiment. FIG. 5 depicts the structure of the command context memory as disclosed herein. The command context is a memory that contains several slots while each slot holds the host command and the parsing results. The number of slots depends on the data storage device capability (i.e., maximum outstanding commands). As shown herein, host buffer pointer fields are added to each slot, and each host buffer pointer field can hold several host pointers. The pointers are fetched immediately after fetching the command, and the number of fetched pointers depends on the size of the command and PRP/SGL method used for the command. As shown in FIG. 5, up to N pointers are fetched when PRP method is used, and M pointers when SGL method is used, wherein N>M. N>M because for SGL method, more information should be kept in the data storage device such as SGL type, size, and full address. In one embodiment, the actual data associated with the fetched pointers is also stored in the command context. In still another embodiment, the actual data associated with the fetched pointers is fetched and stored in a separate location from the command context.

Figure 6:
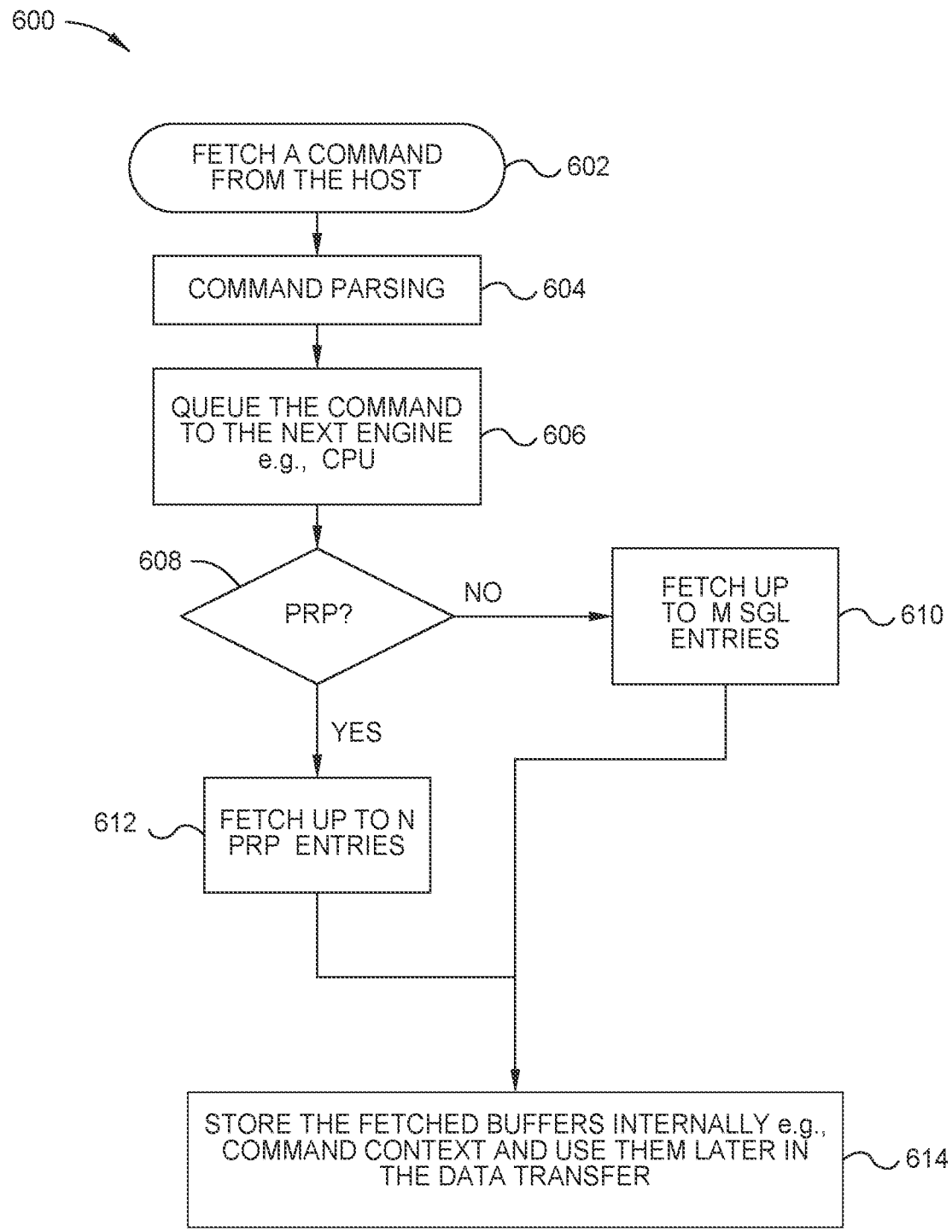
FIG. 6 is a flowchart illustrating immediate partial host buffer fetching according to one embodiment.

FIG. 6 is a flowchart 600 illustrating immediate partial host buffer fetching according to one embodiment. The flow starts by fetching a command from the host at 602. The command is parsed at 604 and stored in the command context memory along with the parsing results by queueing the command to the next engine (e.g., CPU) at 606. Based upon the parsing results, the data storage device controller determines whether external host buffers are associated with the command and the selected PRP/SGL method at 608. Based upon the determination, the data storage device controller fetches the host buffer from the host (i.e., up to N buffer pointers for PRP at 612 and up to M buffer pointers for SGL at 610 while N>M). Finally, the pointers and the relevant attributes are stored in the command context at 614 and will be used later in the data transfer. The host buffers are also fetched and stored in a location separate from the command context, such as DRAM or SRAM or other volatile memory in the data storage device. All of the fetching, including both the pointers and the host buffers, occurs prior to scheduling the command.

Figure 7:
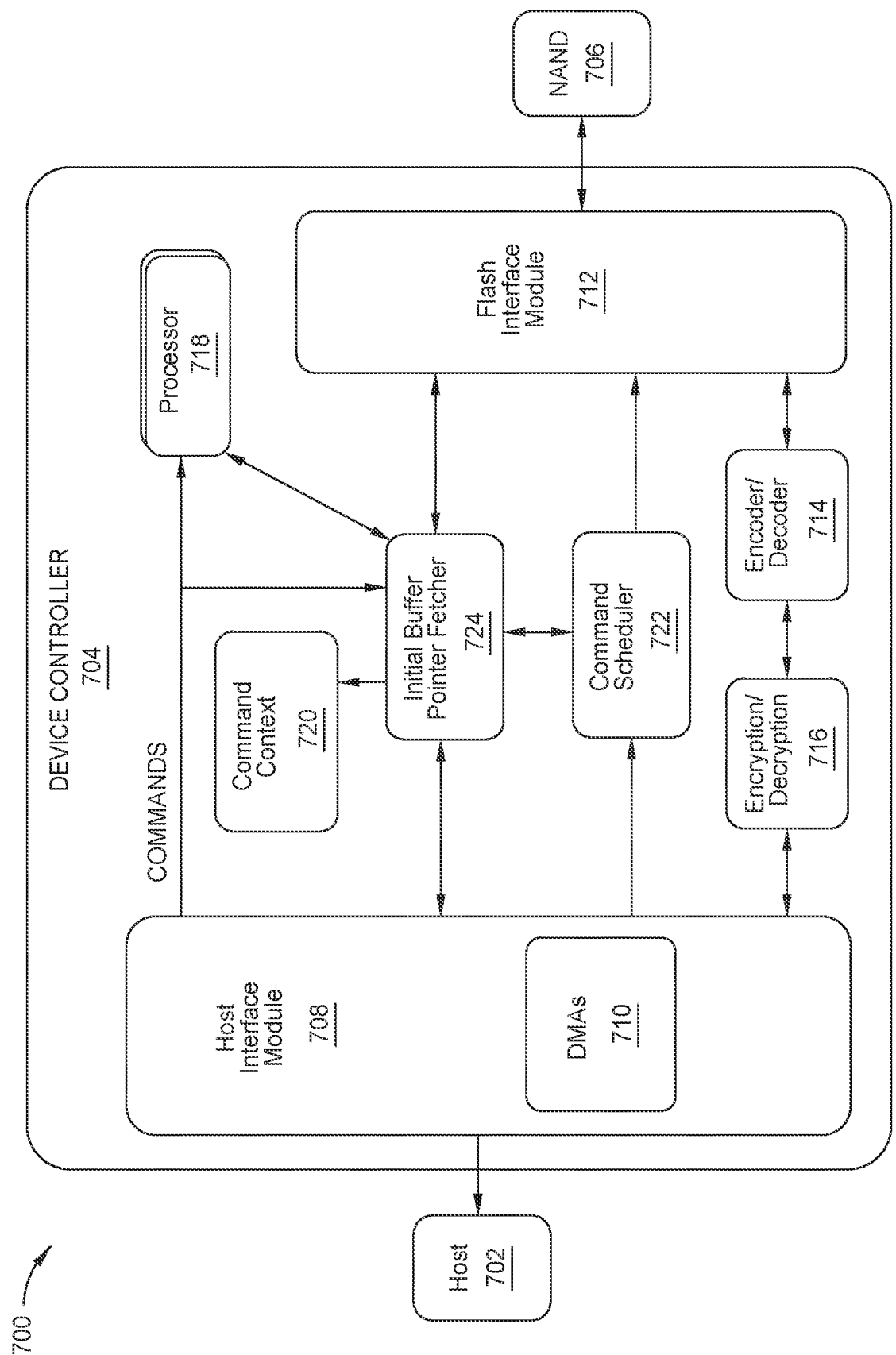
FIG. 7 is a schematic illustration of a storage system according to one embodiment.

FIG. 7 is a schematic illustration of a storage system 700 according to one embodiment. A host 702 is coupled to the device controller 704 which is coupled to the memory device (i.e., NAND) 706. The device controller 704 includes a host interface module (HIM) 708 which includes DMAs 710. The HIM 708 is the interface between the host 702 and the device controller 704. A flash interface module (FIM) 712 is the interface between the NAND 706 and the device controller 704. Encryption/decryption modules 716 and encoder/decoder modules 714 are also present in the device controller 704. The device controller 704 also includes one or more processors 718 or CPUs, a command context 720, a command scheduler 722, and an initial buffer pointer fetcher 724. The initial buffer pointer fetcher 724 implements the functionality discussed herein. In particular, the initial buffer pointer fetcher 724 monitors the HIM 708 with the firmware and queues the command, parses the command, and when needed, fetches the first host buffer pointers associated with the command as discussed herein. The initial buffer pointer fetcher 724 is coupled to the processors 718, command context 720, HIM 708, FIM 712, and command scheduler 722. Commands are transferred from the HIM 708 to the processors 718 and the initial buffer pointer fetcher 724. The command scheduler interacts with the initial buffer pointer fetcher 724, the HIM 708, and the FIM 712. The encryption/decryption modules 716 interact with the HIM 708 and the encoder/decoder modules 714. The encoder/decoder modules interact with the FIM 712 and the encryption/decryption modules 716.

There are several ways in which the pointer fetching may be implemented. In one embodiment, only the pointers are fetched prior to executing the command or even scheduling the command. In another embodiment, not only are the pointers fetched prior to scheduling the command, but the data in the host buffers is fetched as well. The data from the host buffers may be stored in the command context or other memory device such as SRAM, DRAM, or other volatile memory.

Figure 8:
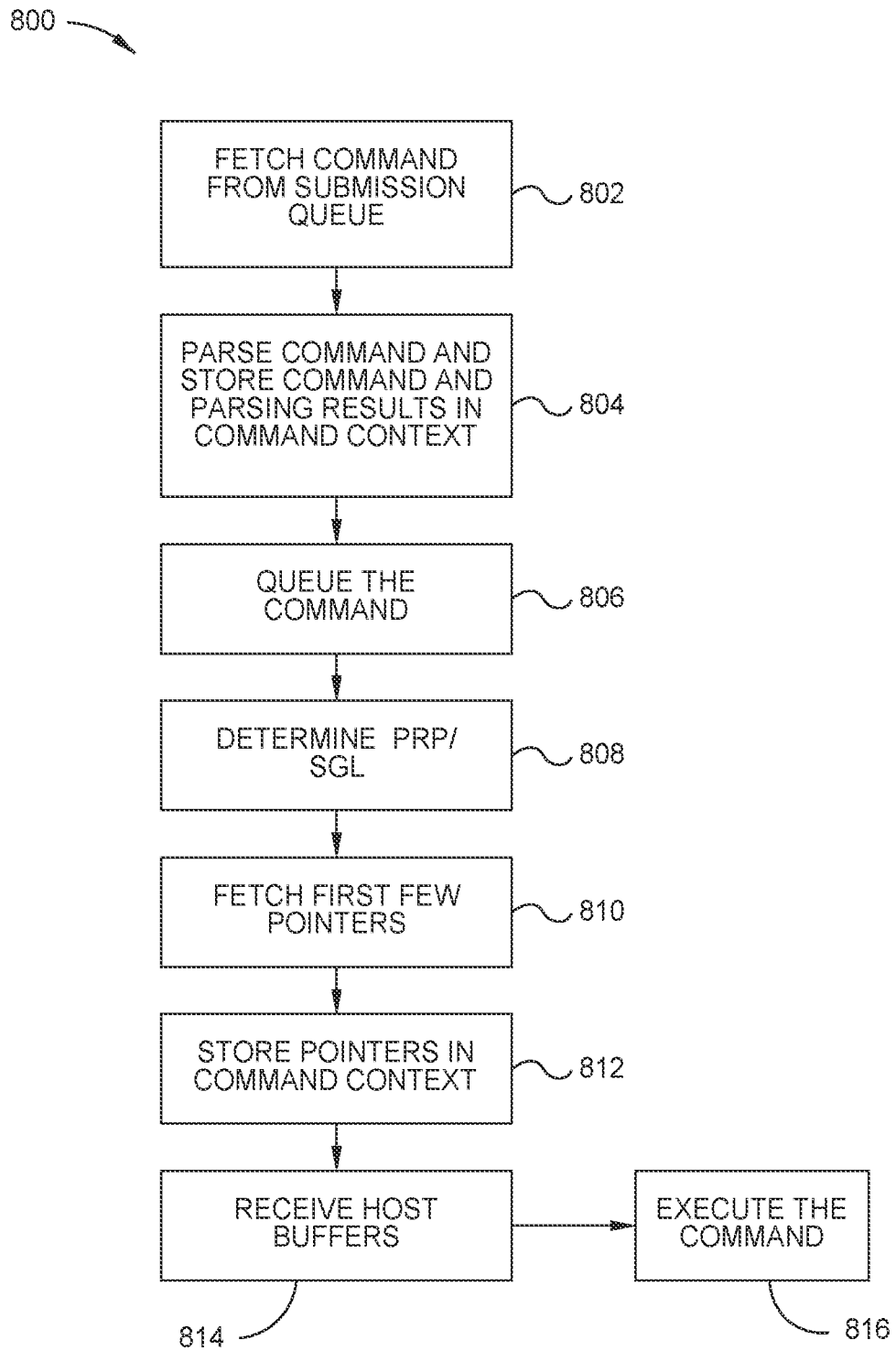
FIG. 8 is a flowchart illustrating command processing according to one embodiment.

FIG. 8 is a flowchart 800 illustrating command processing according to one embodiment. Initially, after the host device has placed a command in a submission queue and rung the doorbell or provided some other indication to the data storage device, the data storage device fetches the command from the submission queue at 802. The data storage device then parses the command at 804 and stores both the command and parsing results in the command context. The data storage device then queues the command to a CPU at 806 and determines whether the command involves PRP or SGL pointers or a combination thereof at 808. The queueing at 806 and the determination at 806 occurs in parallel. Based upon the determination, the first few pointers associated with the command are fetched at 810 and stored in the command context at 812. As noted above, more PRP pointers can be fetched than SGL pointers due to the amount of additional information that is stored with the SGL pointers within the command context. Regardless of whether the pointers are PRP, SGL, or some combination thereof, less than all pointers are fetched. In one embodiment, where the number of pointers is sufficiently small, all pointers are fetched. The host buffers, or more specifically the data stored in the host buffers that is associated with the fetched pointers, is then retrieved at 814 and stored in volatile memory of the data storage device. The command is then executed at 816, and at least a portion of the data associated with the command has already been retrieved and stored in memory of the data storage device. Due to the host buffers already being retrieved by the time the command is executed, latency (or bubbles) are reduced or even eliminated.

By fetching host buffers and PRP and/or SGL entries in parallel with queueing a command to a CPU, some data is fetched prior to scheduling the command which leads to more efficient host buffer fetching and data transfer.

In one embodiment, a data storage device comprises: a memory device; and a controller coupled to the memory device, wherein the controller is configured to: fetch a command from a host device, wherein the command meets a predefined threshold; parse the command; fetch entries associated with the command, wherein the entries are host buffer pointers; and store the fetched entries in a command context with the command and parsing results. The fetching the command, parsing, fetching entries, and storing occurs prior to scheduling the command. The predefined threshold is a size of the command. The predefined threshold is that the command is a non-cached command. The predefined threshold is that the command is a fused command. The controller is further configured to queue the command. The controller is further configured to determine whether the command is associated with a physical region page (PRP) and/or a scatter-gather list (SGL). The determining and the configuring occurs in parallel. Fetching the entries comprises fetching up to N physical page region (PRP) entries and/or up to M scatter-gather list (SGL) entries, wherein N>M. The command context comprises a plurality of slots. A slot of the plurality of slots comprises the command, parsing results, and the fetched entries. The fetched entries comprise: a physical page region (PRP) slot that includes a PRP pointer; and/or a scatter-gather list (SGL) slot that includes an indication of a type of SGL pointer, an SGL pointer, and a size of the SGL pointer.

In another embodiment, a data storage device comprises: a memory device; and a controller coupled to the memory device, wherein the controller includes: a host interface module (HIM); a command scheduler; an initial buffer pointer fetcher, wherein the initial buffer pointer fetcher is configured to fetch one or more entries associated with a command prior to scheduling the command, wherein the fetching is a function of queue depth; a command context; and one or more processors, wherein the initial buffer pointer fetcher is coupled to the HIM, the command scheduler, the command context, and the one or more processors. The initial buffer pointer fetcher is configured to cease fetching when the queue depth exceeds a predetermined threshold. The queue depth is separately calculated between reads and writes. The command context comprises a plurality of slots and each slot is configured to store a plurality of host buffer pointers. The controller is further configured to fetch host buffers associated with the command prior to scheduling the command.

In another embodiment, a data storage device comprises: memory means; and a controller coupled to the memory means, wherein the controller is configured to: receive a command from one or more host devices; parse the command; fetch physical region page (PRP) and/or scatter-gather list (SGL) pointers associated with the command; and fetch host buffers associated with the pointers, wherein fetching the PRP and/or SGL pointers and fetching the host buffers is a function of host device ID. At least one host device has a different quality of service (QoS) requirement compared to another host device. The command is a sequential write command.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
fetch a command from a host device, wherein the command meets a predefined threshold;
parse the command;
fetch entries associated with the command, wherein the entries are host buffer pointers; and
store the fetched entries in a command context with the command and parsing results.

2. The data storage device of claim 1, wherein the fetching the command, parsing, fetching entries, and storing occurs prior to scheduling the command.

3. The data storage device of claim 1, wherein the predefined threshold is a size of the command.

4. The data storage device of claim 1, wherein the predefined threshold is that the command is a non-cached command.

5. The data storage device of claim 1, wherein the predefined threshold is that the command is a fused command.

6. The data storage device of claim 1, wherein the controller is further configured to queue the command.

7. The data storage device of claim 6, wherein the controller is further configured to determine whether the command is associated with a physical region page (PRP) and/or a scatter-gather list (SGL).

8. The data storage device of claim 7, wherein the determining and the configuring occurs in parallel.

9. The data storage device of claim 1, wherein fetching the entries comprises fetching up to N physical page region (PRP) entries and/or up to M scatter-gather list (SGL) entries, wherein N>M, wherein a number of fetched entries depends upon one or more of the following: command type including read commands or write commands or copy commands or administrative commands, command size, parsing results, and combinations thereof.

10. The data storage device of claim 1, wherein the command context comprises a plurality of slots.

11. The data storage device of claim 10, wherein a slot of the plurality of slots comprises the command, parsing results, and the fetched entries.

12. The data storage device of claim 11, wherein the fetched entries comprise:
a physical page region (PRP) slot that includes a PRP pointer; and/or a scatter-gather list (SGL) slot that includes an indication of a type of SGL pointer, an SGL pointer, and a size of the SGL pointer.

13. A data storage device, comprising:
a memory device; and
a controller coupled to the memory device, wherein the controller includes:
a host interface module (HIM);
a command scheduler;
an initial buffer pointer fetcher, wherein the initial buffer pointer fetcher is configured to fetch one or more entries associated with a command prior to scheduling the command, wherein the fetching is a function of queue depth;
a command context; and
one or more processors, wherein the initial buffer pointer fetcher is coupled to the HIM, the command scheduler, the command context, and the one or more processors.

14. The data storage device of claim 13, wherein the initial buffer pointer fetcher is configured to cease fetching when the queue depth exceeds a predetermined threshold.

15. The data storage device of claim 14, wherein the queue depth is separately calculated between reads and writes.

16. The data storage device of claim 13, wherein the command context comprises a plurality of slots and each slot is configured to store a plurality of host buffer pointers.

17. The data storage device of claim 13, wherein the controller is further configured to fetch host buffers associated with the command prior to scheduling the command.

18. A data storage device, comprising:
memory means; and
a controller coupled to the memory means, wherein the controller is configured to:
receive a command from one or more host devices;
parse the command;
fetch physical region page (PRP) and/or scatter-gather list (SGL) pointers associated with the command;
fetch host buffers associated with the pointers, wherein fetching the PRP and/or SGL pointers and fetching the host buffers is a function of host device ID; and
store the fetched host buffers in a command context with the command and parsing results.

19. The data storage device of claim 18, wherein at least one host device has a different quality of service (QoS) requirement compared to another host device.

20. The data storage device of claim 18, wherein the command is a sequential write command.

* * * * *